Feb. 27, 1940.　　　　C. P. FASIG　　　　2,192,072
AUTOMATIC ADVERTISING APPARATUS
Filed Aug. 9, 1939　　　3 Sheets-Sheet 1
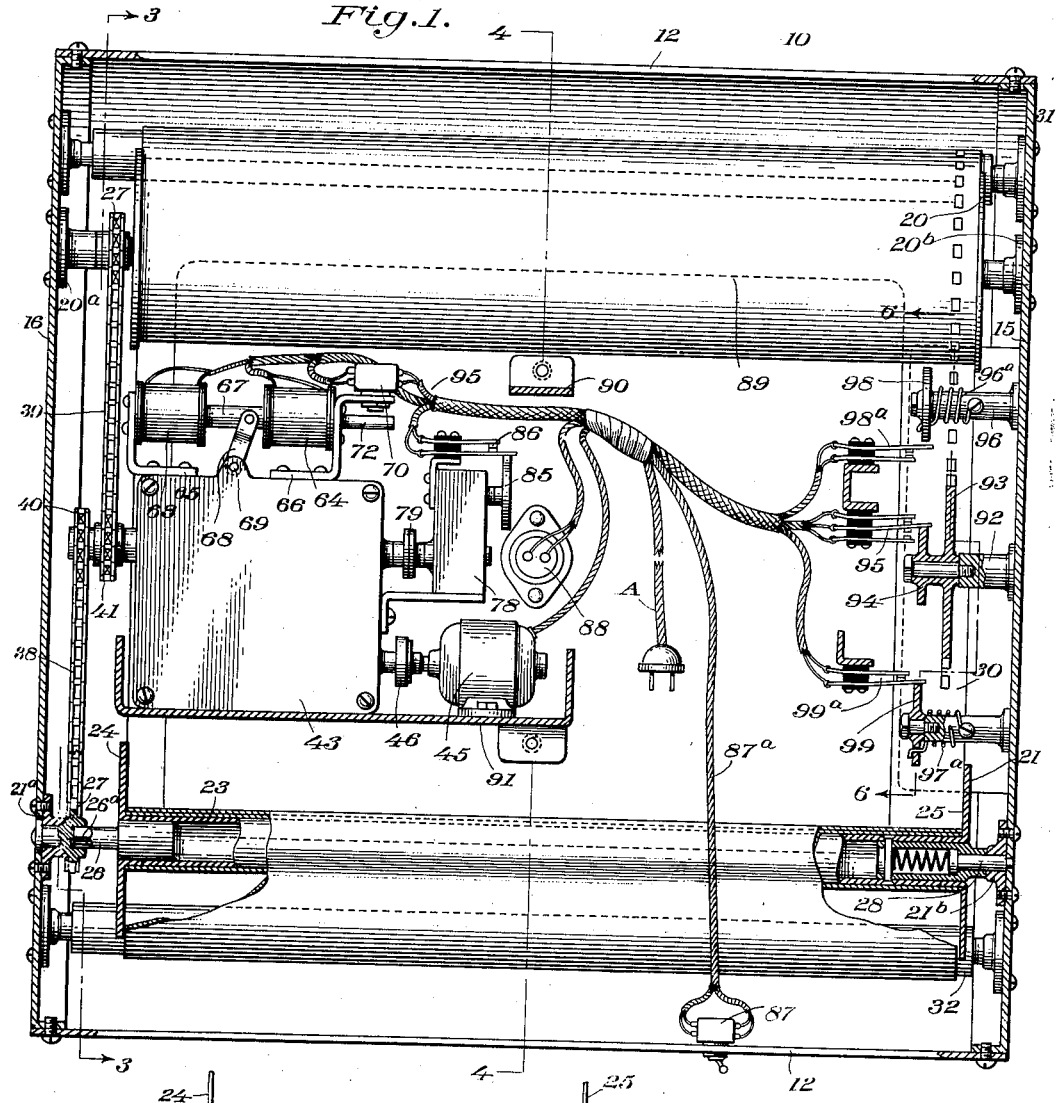
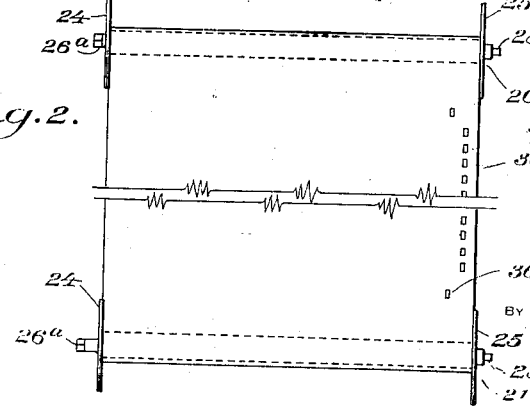
Charles P. Fasig,
INVENTOR
BY Victor J. Evans & Co.
ATTORNEYS Feb. 27, 1940.  C. P. FASIG  2,192,072
AUTOMATIC ADVERTISING APPARATUS
Filed Aug. 9, 1939  3 Sheets-Sheet 2
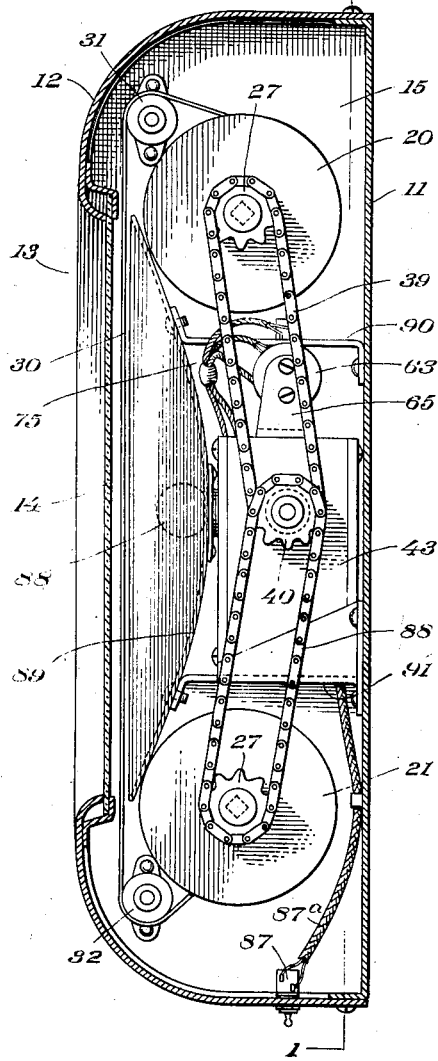
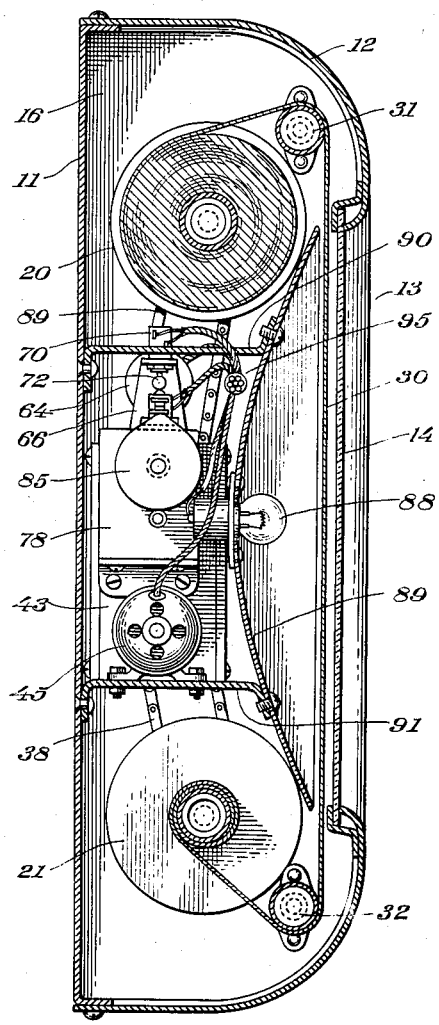
Charles P. Fasig,
INVENTOR
BY Victor J. Evans & Co.
ATTORNEYS Feb. 27, 1940.  C. P. FASIG  2,192,072
AUTOMATIC ADVERTISING APPARATUS
Filed Aug. 9, 1939  3 Sheets-Sheet 3
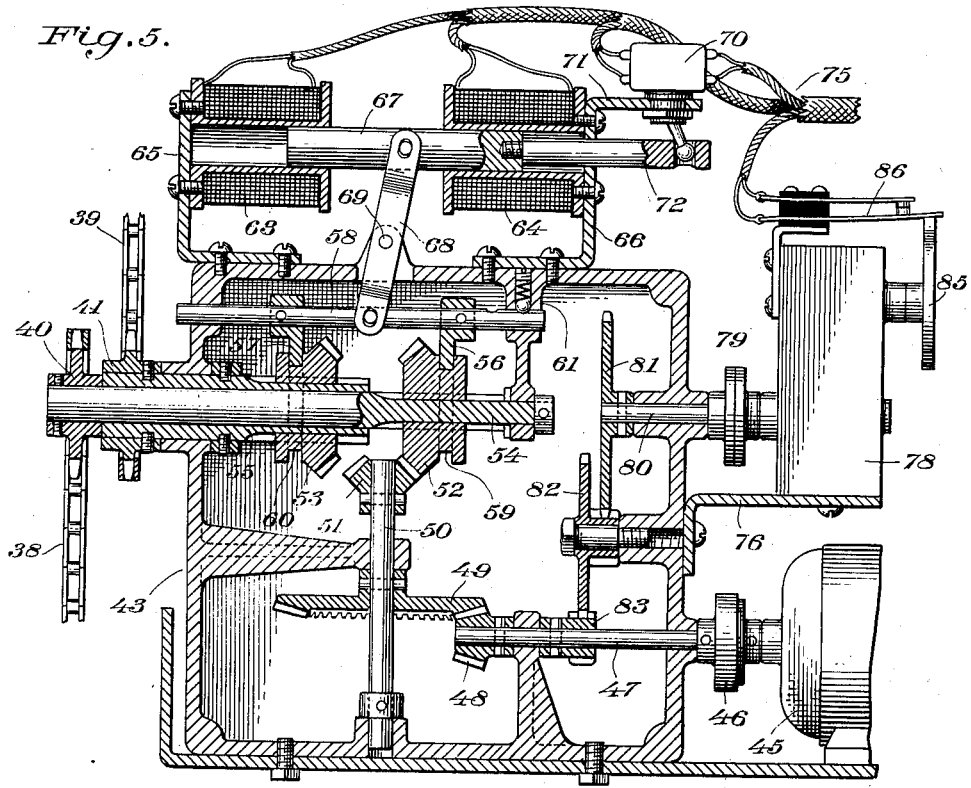
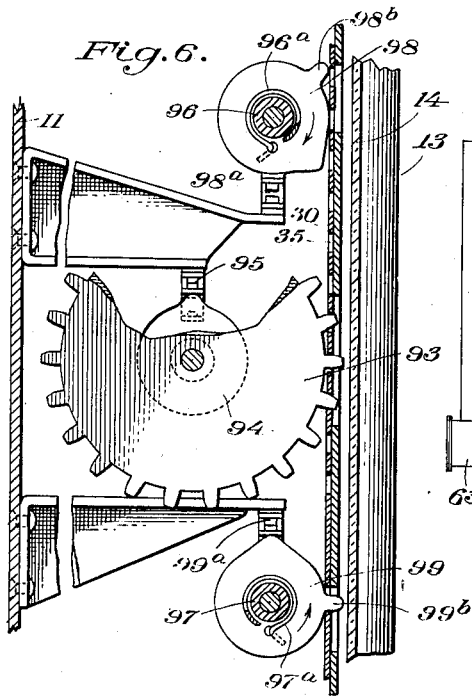
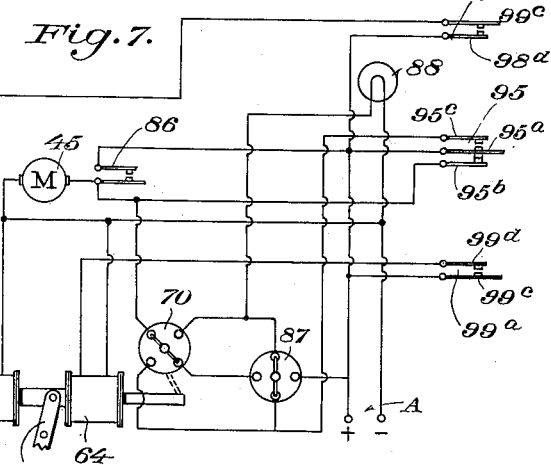
Charles P. Fasig,
INVENTOR
BY Victor J. Evans & Co.
ATTORNEYS Patented Feb. 27, 1940

2,192,072

UNITED STATES PATENT OFFICE 2,192,072

AUTOMATIC ADVERTISING APPARATUS

Charles P. Fasig, Honolulu, Territory of Hawaii

Application August 9, 1939, Serial No. 289,283

5 Claims. (Cl. 40—53)

This invention relates generally to improvements in advertising devices and especially is concerned with a novel automatic device for displaying in sequence concatenated transparencies.

It is among the objects of the present invention to provide a novel automatically functioning advertising device including means for moving in sequence concatenated transparencies into display position and, after a time interval, removing same from display position to a storage.

Another object of this invention is to provide a device for displaying piecemeal a relatively elongated strip of concatenated transparencies in a predetermined progression and at a preselected time reversing the progression and redisplaying the transparencies already displayed in inverse sequence.

Another object of the present invention is to provide a device of the type mentioned including a transparency moving mechanism functioning in a manner such that each transparency displayed is exposed for a predetermined essentially fixed time interval before a source of illumination and, after lapse of the time interval, the light source is extinguished pending the moving of the next transparency into display position.

An advantage of the device according to this invention over other devices of a similar nature now in use is that as aforesaid a light source positioned behind the displayed transparency is periodically extinguished during the movement of the transparency whereby a visual effect is produced which augments the value of the advertising device as regards attracting attention.

Another advantage of the device according to this invention is that, upon occasion, by simple manipulation of a selector switch the mechanism can be adapted to the display of transparencies continuously in but a single progression whereby rewinding of the transparency strip after display of each series of transparency is automatically accomplished with concomitant extinguishment of the light source before which the transparencies are displayed.

Other objects, advantages and features of the novel advertising device according to the present invention will be apparent to those skilled in this art during the course of the following description.

Regarded in certain of its broader aspects, the novel advertising device according to this invention comprises an elongated sheet of concatenated transparencies carried and stored on essentially parallel rotating spools and extending therebetween, said sheet having formed in marginal portions thereof longitudinally extending essentially parallel rows, one continuous, another discontinuous, of perforations; a motor connected to said spools for moving said transparencies from one spool to another; an electrical illuminating device between said rows and behind said sheet; a time controlled first electrical switching means for intermittently causing motion of said sheet; a second electrical switching means operated by motion of said sheet through engagement of parts of said second switching means with a continuous row of perforations formed in the sheet for causing said motor when started to operate for a predetermined time interval and for intermittently operating said illuminating device; and a third electrical switching means operated by motion of said sheet through engagement of parts of said third switching means with a discontinuous row of perforations for intermittently reversing direction of motion of said sheet.

In order to facilitate a fuller and more complete understanding of the matter of the present invention, a specific embodiment thereof herein illustrated will be hereinafter described, it being clearly understood, however, that the embodiment illustrated is provided solely by way of example and is not limitative upon the scope of the invention except as same is expressed in the subjoined claims when read in the light of the specification and drawings.

Referring then to the drawings,

Fig. 1 is a rear elevational view of a preferred embodiment of the instant invention, parts of the device being shown in section and parts being removed for clearness of illustration, Fig. 2 is a top plan view of the sheet of concatenated transparencies shown in position upon the spools, Fig. 3 is a vertical sectional view of Fig. 1 taken along the line 3—3 thereof, Fig. 4 is a vertical sectional view of Fig. 1 taken along the line 4—4 thereof, Fig. 5 is a vertical sectional view of a portion of the device illustrated in Fig. 1 showing details of the power transmission, Fig. 6 is a fragmentary vertical sectional view of Fig. 1 taken along the line 6—6 thereof, and Fig. 7 is a circuit diagram schematic in nature illustrating electrical connections between elements of the device.

Referring now especially to Figs. 1, 3 and 4 of the drawings, it will be noted that the device in its preferred embodiment includes a casing generally designated by the numeral 10 comprising a back 11 carrying a front member 12 provided with a display opening therein generally designated by the numeral 13 having a pane of glass 14 mounted in said opening essentially as shown. The casing also includes sides 15 and 16 attached to the front member 12 and to the back 11 by appropriate fastening means.

Spools 20 and 21 rotatably mounted within the casing 10 upon bearings 20a, 20b and 21a, 21b respectively are arranged in substantial parallelism behind the display opening 13 hereinabove mentioned with the axis of rotation of said spools extending transversely within the casing. It is to be noted that the spools are removable, it being understood, of course, that the spools are similar in construction and, accordingly, the internal parts of the spool 21 alone being shown. Referring especially to Fig. 1, it will be seen that the spool 21 comprises a tubular central element 23 and end flanges 24 and 25 fixedly attached to said tubular element or, if preferred, formed integral therewith. A stud 26 mounted in the end part 24 and axially projecting outwardly from the tubular member 23 is provided with an irregularly shaped end 26a engaging with an opening formed in the rotating gear element 27 mounted in the bearing 21a whereby rotation can be imparted to the spool as will be hereinafter more clearly apparent. The opposite end of the spool is provided with an axially sliding spring-pressed pin 28 projecting from the end of the spool and freely rotatably received within the bearing 21b substantially as shown. The spool can be removed from the bearings by pressing inwardly axially on the pin 28 whereby it is disengaged from the bearing 21b permitting outward movement of the spool and disengagement of the end portion 26a from the gear element 27.

A relatively elongated sheet of concatenated transparencies 30 is carried and stored upon the spools 20 and 21 hereinabove described and, passing over the freely rotating rollers 31 and 32, extends between the spools and rollers within the casing behind the display window 13 essentially as shown. It will be noted, referring especially to Fig. 2, that the sheet is provided in marginal portions thereof with longitudinally extending essentially parallel rows of openings, the row generally designated by the numeral 35 being substantially continuous throughout the length of the sheet and the row generally designated by the numeral 36 being essentially discontinuous.

It will be evident that the sheet 30 can be moved from one spool to the other by rotating the spools and the mechanism for accomplishing the transfer will now be described, reference being made especially to Figs. 1, 3 and 6 wherein details of this portion of the device are best illustrated. The freely rotating gear element 27 associated with the spool 21, hereinabove described, and the corresponding gear likewise designated by the numeral 27 associated with the spool 20 are connected by means of the sprocket chains 38 and 39 respectively with gears 40 and 41 respectively mounted on the drive shaft of the transmission box generally designated by the numeral 43.

The transmission box 43 is operably connected with the motor 45, by means of a coupling 46 mounted on the shaft 47 carrying the pinion gear 48 engaging with the bevel gear 49 mounted on the vertically extending shaft 50 essentially as shown in Fig. 5. A pinion gear 51 mounted on the shaft 50 engages with one of the bevel gears 52 or 53 mounted on the shafts 54 and 55 respectively which, in turn, carry the gears 40 and 41 hereinabove described. It is to be noted that the shafts 54 and 55 are concentrically positioned, the former within the latter in a manner such that relative motion of the shafts is freely permitted or, in other words, when the bevel gear 52 carried on a shaft 54 is in engagement with the pinion 51, the shaft 55, gear 53 and gear 41 freely rotate and similarly, when the pinion 51 is engaged with the bevel gear 53 to cause rotation of the gear 41, the gears 40 and 52 mounted on the shaft 54 freely rotate. The shafts 54 and 55, whereon the gears 52 and 53 are mounted, are axially keyed whereby sliding motion of the gears along the shafts is permitted. The sliding motion is controlled by claws 56 ond 57 carried on the sliding member 58 and engaging annular cut-away formations 59 and 60 formed in the gears 52 and 53 respectively. It will be noted that, inasmuch as the claws are fixedly mounted on the sliding shaft 58, the gears 52 and 53 are held in essentially fixedly axially spaced relationship. Detent engaging means generally designated by the numeral 61 serve to retain the sliding member 58 in either of the positions corresponding to engagement of one of the gears 53 or 52 with the pinion gear 51. It will be apparent to those skilled in this art that, by the hereinabove described transmission mechanism, power from the motor 45 can be transferred to one of the spools depending upon the position of the sliding member 58 or, in other words, that the transmission box serves as a means both of connecting the spools with the motor and for selectively rotating one but not the other of the spools. It of course will be understood, however, that rotation of one of the spools will result in rotation of the other spool inasmuch as the spools are interconnected by the sheet 30 hereinabove described.

The presently preferred mode of imparting sliding motion to the member 58 whereby a transfer of power to one or other spool can be controlled will now be described, reference being made especially to Fig. 1 and Fig. 5. Solenoids 63 and 64, mounted on brackets 65 and 66, are arranged in spaced relationship with a common axis and are provided with a freely sliding core 67 connected to the sliding member 58 by the coupling bar 68 pivoted on the pin 69 essentially as shown. It will be evident that connection of either of the solenoids with a power source can cause motion of the sliding core 67 whereby the sliding member 58 is moved resulting in engagement or disengagement, as the case may be, of the gear 51 with the gear 52 or the gear 53. A toggle switch 70 mounted on the projecting arm 71 of the bracket 66 is actuatable by means of the member 72 carried on the core 67 whereby sliding motion of the core causes the switch to be operated. Appropriate electrical connectors, generally designated by the numeral 75, are provided for connecting the solenoids and the switch with other parts of the circuit, as hereinafter will be described.

Referring especially to Figs. 1 and 5, the numeral 76 designates a bracket attached to the side of the transmission box 43 carrying a spring driven timer unit generally designated by the numeral 78 which, by means of the friction coupling 79, is kept in essentially wound condition through rotation of the shaft 80 connected to the coupling and also connected by the gears 81 and 82 to the gear 83 carried on the shaft 47 which, as mentioned, is driven by the motor 45. The shaft of the timer is provided with a cam 85 which actuates the cam leaf switch 86 for purposes which hereinafter will more clearly be apparent. In a preferred embodiment of the instant invention the timer includes delay mechanism whereby the cam 85 makes, say, for purposes of example, one revolution per minute. The double-pole double-throw switch 87, similar to the double-pole double-throw switch 70 hereinabove described, is mounted in a portion of the casing 12 and is connected to the electrical circuit of the device on the line 87a as will hereinafter be more clearly understood.

Referring now especially to Figs. 3 and 4, it will be perceived that, in the illustrated embodiment of the invention, an electrical illuminating device 88 is provided mounted on a reflector 89 which, in turn, is carried upon the laterally extending supports 90 and 91, the last mentioned support also carrying the transmission box 43, motor 45, and ancillary devices hereinabove described. The periphery of the reflector 89 is essentially rectangular in outline and extends behind at least most of the portion of the sheet visible through the display window 13 formed in the casing 12 hereinabove described whereby the illuminating device serves to actuate and to attract attention to the displayed portion of the sheet.

The electrical switching means controlled by motion of the sheet through the device will now be described, reference being made especially to Figs. 1 and 6 wherein the reference character 92 designates a bearing carrying a freely rotating peripherally toothed wheel 93, the teeth of which engage with the continuous row of openings 35 formed in the sheet 30 hereinabove mentioned whereby motion of the sheet from one spool to the other causes rotation of the wheel 93 together with the cam 94 attached thereto which, in turn, actuates the leaf switch 95. Standards 96 and 97 carry freely rotatable cams 98 and 99 respectively which are spring-pressed in clockwise and anti-clockwise direction (viewed as in Fig. 6) by coil springs 96a and 97a respectively. The cams 98 and 99 actuate the leaf switches 98a and 99a respectively, said switches being connected in electrical circuit with other parts of the device in the manner now to be described. It is to be understood that the cams 98 and 99 engage with and are operated by the openings of the discontinuous row of openings 36 formed in marginal parts of the sheet 30 as hereinabove described. Referring especially to Fig. 6 it will be apparent that, inasmuch as the cam 98 is urged in a clock-wise direction by the spring-pressing means 96a, the tooth 98b thereof, when the sheet 30 moves downwardly, will engage with one of the openings of the row 36 whereby the leaf switch 98a will be operated. In a similar manner, upon reversal of direction of motion of the sheet 30, the tooth 99b of the cam 99 will engage with one of the perforations of the discontinuous row 36 thereby actuating the switch 99b.

The operation of the device will now be described and incidental thereto reference will be made to the circuit diagram of Fig. 7 in order more clearly to point out the cooperation between the various elements of the device whereby novel effects are produced. In loading the device with a sheet of concatenated transparencies 30 care is exercised that the teeth of the wheel 93 engage with the perforations of the continuous row 31 formed in marginal portions of the sheet in a manner such that when a transparency is properly centered behind the display window 13, the cam 94 will occupy the position illustrated in Fig. 6. Under these conditions it will be evident that the motor 45 is connected with the power source generally designated by the numeral A, but that the illuminating means 88 is connected with the power lines through the switch 87. As operation of the timer 78 causes rotation of the cam 85, the leaf switch 86 is closed, whereby the motor 45 is connected with the power lines A, thereby causing the motor to start and, by reason of engagement of the pinion gear 51 with the bevel gear 52, the spool 21 is rotated thereby moving the sheet 30 and causing rotation of the toothed wheel 93 which in turn results in the breaking of the contact between the leaves 95a and 95c of the leaf switch 95 and, by reason of the spring-pressing action of the leaf 95c, closing of the contacts between the leaves 95a and 95b. In this manner the momentary closing of the switch 86 which causes starting of the motor operates the switch 95 to cause connection of the motor 45 to the power lines A through the leaves 95a and 95b with the switch 95. It is to be noted that when the leaf 95a moves out of contact with the leaf 95c of the leaf switch 95 the circuit connecting the illuminating means 88 with the power lines is interrupted and, accordingly, during the motion of the sheet 30 the illuminating means is extinguished or at least is not connected with the power line except when the cam 94 occupies the position illustrated in Fig. 6. As the succeeding transparency moves into place before the display window 13, the cam 94 moves into the position illustrated in Fig. 6 whereby the illuminating means 88 is again connected with the power source and the motor 45 is disconnected from the power lines A by movement of the leaf 95a from contact with the leaf 95b into contact with the leaf 95c. It, of course, will be understood that an appreciable time interval elapses between the movement of the new transparency into position before the illuminating means and the succeeding operation of the switch 86 by the timing means 78. While this time interval can be adjusted to suit requirements, the present inventor has found that a timer operating in a manner such that the cam 85 makes one revolution a minute functions satisfactorily in conjunction with other parts of the device, ten seconds approximately are required for movement of the successive transparency into position subsequent to the momentary operation of the switch 86 of the timer.

The novel means according to the present invention for causing reversal of the direction of the travel of the transparency sheet as the ends thereof are approached will now be described. It is to be understood that the discontinuous row of perforations 36 comprises two perforations, one near each end of the sheet. Assuming for instance that the sheet is moving from the spool 21 to the spool 20 as the end of the sheet is approached (see Fig. 6), the tooth 99b of the cam 99 spring-pressed by the means 97a moves into engagement with one of the perforations of the discontinuous row of openings 36 whereby the cam assumes the position shown in Fig. 6 and the switch 99a is operated. In the operation of the switch 99a the solenoid 64 is connected with the power lines A thereby causing the core 67 to be moved toward the solenoid and moving the various gears and ancillary structure to the positions illustrated in Fig. 5. It is to be noted that under these conditions the motor 45 operates a spool 21 thereby causing the sheet of concatenated transparencies to be wound on said spool 21 from the spool 20 or, in other words, the direction of motion of the sheet is reversed. As the opposite end of the sheet approaches the display window, the tooth 93b of the cam 98 spring-pressed by the means 96a engages with an opening formed in the sheet, thereby causing operation of the switch 98a which results in connection of the solenoid 63 with the power lines A and in reversal of the direction of motion of the sheet inasmuch as the motor 45 is coupled with and rotates the spool 20 instead of the spool 21.

When it is desirable to operate the transparency display device for but one succession of transparencies but continuous in that succession, the switch 87 is manipulated whereby the contact arms of the switch are thrown from the position shown in Fig. 7 to establish connection between the positive power line and the switch 70. With the circuit so altered, current is fed directly to the motor 45 whenever the solenoid core 67 occupies the position illustrated in Fig. 5 but, when the end of the sheet is reached, in other words, when the switch 98a is operated, the device functions normally, that is to say, the illuminating means intermittently illuminates the successively displayed transparencies. Thus, except for return of the sheet to starting position without operation of the illuminating means, there is no difference in operation of the device for either position of the switch 87.

Having thus described the present invention, what is desired to secure by Letters Patent is:

1. An advertising device comprising a casing having a display opening formed in a side thereof; spaced essentially parallel rotating spools within said casing behind said opening; an elongated sheet of concatenated transparencies carried and stored on said spools and in part extending therebetween behind said display opening, said sheet having formed in marginal portions thereof longitudinally extending essentially parallel rows, one continuous, another discontinuous, of perforations; an electric motor connected to said spools for moving said transparencies behind said opening from one of said spools to another; an electrical illuminating device within said casing behind said opening and part of said sheet; a time controlled first electrical switching means for intermittently starting said motor; a second electrical switching means operated by motion of said sheet through engagement of parts of said second switching means with the continuous row of perforations formed in the sheet, for causing said motor when started to operate for a predetermined time interval and for intermittenly lighting and extinguishing said illuminating device; and a third electrical switching means operated by motion of said sheet through engagement of parts of said third switching means with the discontinuous row of perforations for intermittently reversing direction of motion of said sheet.

2. An advertising device comprising a casing having a display opening formed in a side thereof; spaced essentially parallel rotating spools within said casing behind said opening; an elongated sheet of concatenated transparencies carried and stored on said spools and in part extending therebetween behind said display opening, said sheet having formed in marginal portions thereof longitudinally extending essentially parallel rows, one continuous, another discontinuous, of perforations; an electric motor connected to said spools for moving said transparencies behind said opening from one of said spools to another; an electrical illuminating device within said casing behind said openng and part of said sheet; a time controlled first electrical switching means for intermittently starting said motor; a second electrical switching means operated by motion of said sheet through engagement of parts of said second switching means with the continuous row of perforations formed in the sheet, for causing said motor when started to operate for a predetermined time interval and for intermittently lighting and extinguishing said illuminating device, said second electrical switching means comprising a toothed cam carrying wheel, a leaf switch actuated by said cam; and a third electrical switching means operated by motion of said sheet through engagement of parts of said third switching means with the discontinuous row of perforations, for intermittently reversing direction of motion of said sheet.

3. An advertising device comprising a casing having a display opening formed in a side thereof; spaced essentially parallel rotating spools within said casing behind said opening; an elongated sheet of concatenated transparencies carried and stored on said spools and in part extending therebetween behind said display opening, said sheet having formed in marginal portions thereof longitudinally extending essentially parallel rows, one continuous, another discontinuous, of perforations; an electric motor connected to said spools for moving said transparencies behind said opening from one of said spools to another; an electrical illuminating device within said casing behind said opening and part of said sheet; a time controlled first electrical switching means for intermittently starting said motor; a second electrical switch means operated by motion of said sheet through engagement of parts of said second switching means with the continuous row of perforations formed in the sheet, for causing said motor when started to operate for a predetermined time interval and for intermitently lighting and extinguishing said illuminating device, said second electrical switch means comprising a toothed cam carrying wheel, a leaf switch actuated by said cam; and a third electrical switching means operated by motion of said sheet through engagement of parts of said third switching means with the discontinuous row of perforations, for intermittently reversing the direction of motion of said sheet, said third electrical switching means comprising a toothed cam, and a leaf switch operated by said cam.

4. An advertising device comprising supported rotating spools; a partially exposed sheet of concatenated transparencies on said spools having marginally located longitudinally extending essentially parallel rows of perforations, one continuous, another discontinuous; a motor driving said spools and moving said sheet; a light behind the exposed portion of said sheet; a time controlled first electrical switching means for starting said motor; a second electrical switching means for causing said motor when started to operate for a predetermined time interval and for intermittently lighting said light, comprising a toothed cam wheel engaging during motion of said sheet with the continuous row of perforations formed in the sheet and a switch operated by the cam; and a third electrical switching means comprising a toothed cam wheel engaging during motion of said sheet with the discontinuous row of perforations for reversing the direction of motion of said sheet and a switch operated by the cam.

5. An advertising device comprising supported rotating spools; a partially exposed sheet of concatenated transparencies on said spools having marginally located longitudinally extending essentially parallel rows of perforations, one continuous, another discontinuous; a motor driving said spools and moving said sheet; a light behind the exposed portion of said sheet; a time controlled first electrical switching means for starting said motor; a second electrical switching means controlled by the continuous row of perforations for causing said motor when started to operate for a predetermined time interval and for intermittently lighting said light; and a third electrical switching means controlled by the discontinuous row of perforations for reversing the direction of motion of said sheet.

CHARLES P. FASIG.